United States Patent
Vasa

(10) Patent No.: US 6,301,256 B1
(45) Date of Patent: Oct. 9, 2001

(54) SELECTION TECHNIQUE FOR PREVENTING A SOURCE PORT FROM BECOMING A DESTINATION PORT IN A MULTI-PORT BRIDGE FOR A LOCAL AREA NETWORK

(75) Inventor: Suresh L. Vasa, Cupertino, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/064,676

(22) Filed: Apr. 22, 1998

Related U.S. Application Data

(60) Provisional application No. 60/059,171, filed on Sep. 17, 1997.

(51) Int. Cl.$^7$ ............................................. H04J 3/02
(52) U.S. Cl. ............................................. 370/401
(58) Field of Search ............................ 370/401, 428, 370/402, 429, 403, 404, 268, 239, 330, 412, 392, 431, 419, 421, 423, 425, 389, 399, 229, 396, 398, 406, 408, 254, 256, 257; 709/227, 249, 250, 223, 242, 228, 239

(56) References Cited

U.S. PATENT DOCUMENTS

| | | | |
|---|---|---|---|
| H586 | 2/1989 | Kun | 370/94 |
| Re. 33,426 | 11/1990 | Sugimoto et al. | 370/85.14 |
| 3,735,357 | 5/1973 | Manolick et al. | 340/172.5 |

(List continued on next page.)

FOREIGN PATENT DOCUMENTS

| | | | |
|---|---|---|---|
| 0 397 188 A2 | 11/1990 | (EP) | H04L/12/46 |
| 0597789 A1 | 5/1994 | (EP) | H04L/12/46 |
| 0 609 626 A2 | 8/1994 | (EP) | H04L/12/50 |
| 0 642 246 A2 | 3/1995 | (EP) | H04L/29/06 |
| 0785698 A2 | 7/1997 | (EP) | H04Q/11/04 |

(List continued on next page.)

OTHER PUBLICATIONS

Hermant Kanakia and David R. Cheriton, "The VMP Network Adapter Board (NAB): High–Performance Network Communication for Multiprocessors," Computer Communications Review, vol. 18, No. 4, pp. 175–187, 1988.

(List continued on next page.)

*Primary Examiner*—Dang Ton
(74) *Attorney, Agent, or Firm*—Haverstock & Owens LLP

(57) ABSTRACT

A selection technique for filtering packets in a multi-port bridge for a local area network, thus, preventing a source port for a packet from becoming a destination port for the packet. The bridge includes a memory for storing packets and a plurality of ports. Each port includes a receive buffer, a transmit buffer and a memory pointer buffer. A packet is received by the receive buffer of a port. As the packet is still being received, a look-up table is utilized to determine which one or ones of the plurality of ports are the appropriate destination ports for the packet. Each of the ports is assigned a respective one of the signal lines of the communication bus. A product of utilizing the look-up tables is referred to as a bit-map of the destination ports for the packet. The bit-map includes a logic level for each signal line assigned to a port wherein the logic level is indicative of whether the corresponding port is a destination port for the packet. The bit-map is placed on the communication bus which is monitored by each port. If the source port is designated as a destination port in the bit-map, this indicates that the source and destination nodes are on the same segment of the network (intra-segment communication). From the bit map, the source port also determines whether any other port is designated as a destination for the packet. If no other port is designated as a destination, the source port discards the incoming packet, thus filtering the packet. If, however, any other port is also designated as a destination for the packet, the source port continues receiving the packet for transmission by such other port.

32 Claims, 7 Drawing Sheets

U.S. PATENT DOCUMENTS

| | | | |
|---|---|---|---|
| 4,213,201 | 7/1980 | Gagnier et al. | 370/62 |
| 4,589,120 | 5/1986 | Mendala | 375/117 |
| 4,597,078 | 6/1986 | Kempf | 370/94 |
| 4,627,052 | 12/1986 | Hoare et al. | 370/88 |
| 4,706,081 | 11/1987 | Hart et al. | 340/825.03 |
| 4,707,827 | 11/1987 | Bione et al. | 370/85 |
| 4,710,769 | 12/1987 | Friedman et al. | 340/825.03 |
| 4,715,030 | 12/1987 | Koch et al. | 370/85 |
| 4,718,060 | 1/1988 | Oguchi et al. | 370/85 |
| 4,723,311 | 2/1988 | Moustakas et al. | 455/612 |
| 4,727,537 | 2/1988 | Nichols | 370/85 |
| 4,727,538 | 2/1988 | Furchtgott et al. | 370/85 |
| 4,737,953 | 4/1988 | Koch et al. | 370/94 |
| 4,744,078 | 5/1988 | Kowalczyk | 370/85 |
| 4,797,879 | 1/1989 | Habbab et al. | 370/3 |
| 4,823,338 | 4/1989 | Chan et al. | 370/85 |
| 4,849,962 | 7/1989 | Morimoto et al. | 370/29 |
| 4,878,216 | 10/1989 | Yunoki | 370/60 |
| 4,901,308 | 2/1990 | Deschaine | 370/58.1 |
| 4,905,219 | 2/1990 | Barr et al. | 370/4 |
| 4,933,937 | 6/1990 | Konishi | 370/85.13 |
| 4,935,922 | 6/1990 | Wicklund et al. | 370/60 |
| 5,016,159 | 5/1991 | Maruyama | 364/200 |
| 5,020,052 | 5/1991 | DePrycker et al. | 370/60 |
| 5,027,350 | 6/1991 | Marshall | 370/85.13 |
| 5,048,014 | 9/1991 | Fischer | 370/85.5 |
| 5,107,489 | 4/1992 | Brown et al. | 370/58.2 |
| 5,119,367 | 6/1992 | Kawakatsu et al. | 370/54 |
| 5,140,585 | 8/1992 | Tomikawa | 370/60.1 |
| 5,151,897 | 9/1992 | Suzuki | 370/85.13 |
| 5,151,994 | 9/1992 | Wille et al. | 395/800 |
| 5,166,926 | 11/1992 | Cisneros et al. | 370/60 |
| 5,184,346 | 2/1993 | Kozaki et al. | 370/60 |
| 5,229,993 | 7/1993 | Foudriat et al. | 370/85.3 |
| 5,241,550 | 8/1993 | Kusano | 371/71 |
| 5,243,699 | 9/1993 | Nickolls et al. | 395/275 |
| 5,274,631 | 12/1993 | Bhardwaj | 370/60 |
| 5,307,345 | 4/1994 | Lozowick et al. | 370/61 |
| 5,339,316 | 8/1994 | Diepstraten | 370/85.13 |
| 5,353,535 | 10/1994 | Vijeh et al. | 380/29 |
| 5,379,289 | 1/1995 | DeSouza et al. | 370/85.13 |
| 5,379,296 | 1/1995 | Johnson et al. | 370/60 |
| 5,386,413 | 1/1995 | McAuley et al. | 370/54 |
| 5,404,459 | 4/1995 | Gulick et al. | 395/275 |
| 5,410,754 | 4/1995 | Klotzbach et al. | 370/85.13 |
| 5,430,762 | 7/1995 | Vijeh et al. | 375/211 |
| 5,432,511 | 7/1995 | Sadjadian et al. | 341/61 |
| 5,434,861 | 7/1995 | Pritty et al. | 370/85.8 |
| 5,442,578 | 8/1995 | Hattori | 364/746.1 |
| 5,446,726 | 8/1995 | Rostoker et al. | 370/17 |
| 5,448,565 * | 9/1995 | Chang et al. | 370/402 |
| 5,457,446 | 10/1995 | Yamamoto | 340/825.24 |
| 5,457,679 | 10/1995 | Eng et al. | 370/16 |
| 5,481,540 | 1/1996 | Huang | 370/85.13 |
| 5,487,067 | 1/1996 | Matsuhige | 370/85.7 |
| 5,502,748 | 3/1996 | Wilkinson | 375/354 |
| 5,506,902 | 4/1996 | Kubota | 380/9 |
| 5,515,376 | 5/1996 | Murthy et al. | 370/85.13 |
| 5,515,513 * | 5/1996 | Metzger et al. | 709/249 |
| 5,517,494 | 5/1996 | Green | 370/60 |
| 5,521,913 | 5/1996 | Gridley | 370/58.2 |
| 5,522,059 | 5/1996 | Marushima et al. | 395/476 |
| 5,530,434 | 6/1996 | Kanda | 340/825.04 |
| 5,541,923 | 7/1996 | Kato | 370/85.1 |
| 5,550,826 | 8/1996 | Tanaka et al. | 370/85.8 |
| 5,559,796 | 9/1996 | Edem et al. | 370/60 |
| 5,560,038 | 9/1996 | Haddock | 395/800 |
| 5,565,929 | 10/1996 | Tanaka | 348/565 |
| 5,568,476 | 10/1996 | Sherer et al. | 370/60 |
| 5,568,643 | 10/1996 | Tanaka | 395/739 |
| 5,570,330 | 10/1996 | Okawa | 369/44.32 |
| 5,570,466 | 10/1996 | Oechsle | 395/200.15 |
| 5,598,161 | 1/1997 | Yamada | 341/159 |
| 5,598,278 | 1/1997 | Tanaka et al. | 386/96 |
| 5,598,391 | 1/1997 | Mukawa | 369/54 |
| 5,598,581 | 1/1997 | Daines et al. | 395/872 |
| 5,600,664 | 2/1997 | Hayashi | 371/43 |
| 5,602,851 * | 2/1997 | Terashita et al. | 370/403 |
| 5,608,730 | 3/1997 | Osakabe et al. | 370/471 |
| 5,608,879 | 3/1997 | Cooke | 395/290 |
| 5,617,421 | 4/1997 | Chin et al. | 370/402 |
| 5,621,725 | 4/1997 | Kawamura et al. | 370/43 |
| 5,640,399 | 6/1997 | Rostoker et al. | 370/392 |
| 5,680,622 | 10/1997 | Even | 395/709 |
| 5,721,927 | 2/1998 | Baraz et al. | 395/705 |
| 5,761,435 | 6/1998 | Fukuda et al. | 395/200.68 |
| 5,764,895 * | 6/1998 | Chung | 709/250 |
| 5,802,047 | 9/1998 | Kinoshita | 370/359 |
| 5,808,816 | 9/1998 | Picazo, Jr. et al. | 395/200.53 |
| 5,844,903 * | 12/1998 | Terashita et al. | 370/403 |
| 5,852,607 | 12/1998 | Chin | 370/401 |
| 5,857,075 * | 1/1999 | Chung | 709/223 |
| 5,859,837 | 1/1999 | Crayford | 370/230 |
| 5,878,028 | 3/1999 | Roy et al. | 370/235 |
| 5,884,040 * | 3/1999 | Chung | 709/227 |
| 5,917,821 | 6/1999 | Gobuyan et al. | 370/392 |
| 5,923,654 | 7/1999 | Schnell | 370/390 |
| 5,923,660 | 7/1999 | Shemla et al. | 370/402 |
| 5,926,473 | 7/1999 | Gridley | 370/389 |
| 5,940,596 | 8/1999 | Rajan et al. | 395/200.72 |
| 5,940,597 | 8/1999 | Chung | 395/200.72 |
| 5,949,788 | 9/1999 | Friedman et al. | 370/431 |
| 5,951,651 * | 9/1999 | Lakshman et al. | 709/239 |
| 5,978,378 * | 11/1999 | Van Seters et al. | 370/401 |
| 5,991,305 | 11/1999 | Simmons et al. | 370/422 |
| 6,018,526 | 1/2000 | Liu et al. | 370/401 |
| 6,044,080 | 3/2000 | Antonov | 370/401 |
| 6,067,300 | 5/2000 | Baumert et al. | 370/413 |
| 6,070,205 | 5/2000 | Kato et al. | 710/100 |
| 6,075,773 | 6/2000 | Clark et al. | 370/241 |
| 6,081,532 | 6/2000 | Fiammante | 370/401 |
| 6,084,877 | 7/2000 | Egbert et al. | 370/389 |
| 6,088,356 | 7/2000 | Hendel et al. | 370/392 |
| 6,091,725 * | 7/2000 | Cheriton et al. | 370/392 |
| 6,094,434 | 7/2000 | Kotzur et al. | 370/401 |
| 6,098,110 | 8/2000 | Witkowski et al. | 709/249 |
| 6,108,345 | 8/2000 | Zhang | 370/445 |
| 6,111,874 | 8/2000 | Kerstein | 370/389 |
| 6,122,277 | 9/2000 | Garmire et al. | 370/390 |
| 6,130,891 | 10/2000 | Lam et al. | 370/401 |
| 6,137,797 | 10/2000 | Bass et al. | 370/392 |

FOREIGN PATENT DOCUMENTS

| | | | |
|---|---|---|---|
| WO 96/13922 | 5/1996 | (WO) | H04L/12/44 |
| WO 96/21302 | 7/1996 | (WO) | H04L/12/46 |
| WO 97/18657 | 5/1997 | (WO) | H04L/12/18 |

OTHER PUBLICATIONS

William Stallings, "Internetworking: A Guide for the Perplexed," Telecommunications, North American Edition, Sep. 1989, pp. 25–30.

Bob Stewart and Bill Hawe, "Local Area Network Applications," Telecommunications, North American Edition, Sep. 1984, pp. 96f–96j, and 96u.

Bob Stewart, Bill Hawe, and Alan Kirby, "Local Area Network Connection," Telecommunications, North American Edition, Sep. 1984, pp. 54–55, 58–59, and 66.

National Semiconductor, databook, "DP83934 SONIC™—T Systems–Oriented Network Interface Controller with Twisted Pair Interface" pp. 1–457 to 1–458, 1–468 to 1–477, 1–480, 1–512, 1–127 to 1–529.

NEC Data Sheet, MOS Integrated Circuit µPD4516421, 4516821, 4516161 16M–bit Synchronous DRAM, Nov. 1995.

Printout of internet website http://www.ti.com/sc/docs/network/gtswitch/product/htm#3150al, ThunderSWITCH Product Information "ThunderSWITCH Product Descriptions," Feb. 1997.

Texas Instruments Product Preview SPWS027, "TNETX3150 ThunderSWITCH™ 15–Port 10–/100–MBIT/S Ethernet™ Switch," pp. 1–85, Sep. 1996.

* cited by examiner

SELECTION TECHNIQUE FOR PREVENTING A SOURCE PORT FROM BECOMING A DESTINATION PORT IN A MULTI-PORT BRIDGE FOR A LOCAL AREA NETWORK

This application claims the benefit of U.S. Provisional Application No. 60/059,171, filed Sep. 17, 1997, entitled, "MULTI-PORT BRIDGE FOR A LOCAL AREA NETWORK."

FIELD OF THE INVENTION

The invention relates to a multi-port bridge for a local area network. More particularly, the invention relates to selection technique for filtering packets in a multi-port bridge for a local area network, thus, preventing a source port for a packet from becoming a destination port for the packet

BACKGROUND OF THE INVENTION

Nodes of a local area network (LAN) are typically interconnected by a shared transmission medium. The amount of data traffic that the shared transmission medium can accommodate, however, is limited. For example, only one node at a time can successfully transmit data to another node over the shared transmission medium. If two or more nodes simultaneously attempt to transmit data, a data collision occurs, which tends to corrupt the data being transmitted. Thus, nodes that share a transmission medium are considered to be in a same collision domain.

A multi-port bridge allows simultaneous communication between nodes of the LAN by segmenting the LAN into multiple collision domains (also referred to as network segments), each segment having a corresponding transmission medium. FIG. 1 illustrates a conventional local area network (LAN) including a multi-port bridge 20. The multi-port bridge 20 in this example has eight ports A–H, though the number of ports can vary. Each port A–H is connected to a segment 21–28 of the LAN. Each segment 21–28 typically includes one or more nodes 29–44, such as a workstation, a personal computer, a data terminal, a file server, a printer, a scanner, a modem, a facsimile or other conventional digital device. Each of the nodes 29–44 has an associated node address which uniquely identifies the node. The nodes 29–44 are configured to send data, one to another, in the form of discrete data packets.

When the LAN operates according to Ethernet standards, such as the Institute of Electrical and Electronics Engineers (IEEE) 802.3 standard, data is communicated in the form of discrete packets. FIG. 2 illustrates a conventional IEEE 802.3 data packet 50. The data packet 50 includes an eight byte long pre-amble 51 which is generally utilized for synchronizing a receiver to the data packet 50. The pre--amble 51 includes seven bytes of preamble and one byte of start-of-frame. Following the preamble 51, the data packet 50 includes a six byte long destination address 52, which is the node address of a node which is an intended recipient for the data packet 50. Next, the data packet 50 includes a six byte long source address 53, which is the node address of a node which originated the data packet 50. Following the source address 53 is a two-byte length field 54. Following the length field 54 is a data field 55. The data field 55 can be up to 1500 bytes long. Finally, the data packet 50 includes a four-byte frame check field 55 which allows a recipient of the data packet 50 to determine whether an error has occurred during transmission of the data packet 50.

When a node (source node) sends data to another node (destination node) located on its same segment of the LAN (intra-segment communication), the data is communicated directly between the nodes without intervention by the multi-port bridge 20 and is known as an intrasegment packet. Therefore, when the multi-port bridge 20 receives an intra-segment packet, the multi-port bridge 20 does not bridge the packet (the packet is filtered). When a node (source node) sends a data packet to another node (destination node) located on a different segment (inter-segment communication), the multi-port bridge 20 appropriately forwards the data packet to the destination node.

The multi-port bridge 20 (FIG. 1) receives each data packet 50 (FIG. 2) and must determine whether the data packet 50 is for intra-segment communication or inter-segment communication, and if the data packet 50 is for inter-segment communication, the multi-port bridge 20 must determine which port (destination port) the data packet 50 is to be directed based upon the destination address 52 contained in the data packet 50. This can be accomplished utilizing a look-up table. Conventionally, the look-up table is constructed by executing a learning phase for each received data packet 50 to store data in the table and by executing a look-up phase for each received data packet 50 to look-up data stored during the learning phase for a prior packet.

Once the look-up is performed, however, the packets need to be appropriately filtered. Therefore, what is needed is improved technique for filtering packets in a multi-port bridge for a local area network thereby preventing a source port from becoming a destination port for a packet.

SUMMARY OF THE INVENTION

The invention is a method of and apparatus for filtering packets in a multi-port bridge for a local area network thereby preventing a source port from becoming a destination port for a packet. The multi-port bridge includes a switch engine, a memory and a plurality of ports, all of which are interconnected by a high speed communication bus. The switch engine includes a bus controller, a memory controller and a look-up controller, each preferably being a finite state machine. The memory controller provides an interface between the memory and the communication bus. The bus controller controls access to the communication bus by collecting requests and granting the requests according to an appropriate priority. The look-up controller determines to which port (uni-cast packet) or ports (multi-cast packet) each packet is to be directed based upon the destination node address for the packet.

The high speed communication bus includes single bit signal lines dedicated to communicating control commands, signal lines dedicated to communicating data, and several signal lines having special purposes. For example, two signal lines are preferably dedicated to initiating access to the bus, each having a respective priority, another signal line is dedicated to jam requests (for applying backpressure), still another signal line is dedicated to the memory controller and yet another signal line is dedicated to providing a bus clock signal. The memory includes look-up tables utilized for appropriately directing data packets among the ports, packet buffers utilized for temporarily storing packets and mailboxes for providing an interface between the switch engine and an external processor.

Each port includes a port controller, a MAC transceiver, a receive finite state machine, a transmit finite state machine, a receive buffer, a transmit buffer and a memory pointer buffer. Packets received from a LAN segment by the transceiver are directed to the communication bus through the receive buffer, while packets to be transmitted over the LAN segment are directed to the transceiver through the transmit buffer. The memory pointer buffer stores memory pointers in a queue for transmission by the port, one memory pointer for each data packet being stored in the packet buffers of the memory.

A data packet originating from a node (source node) in a segment of the LAN is received by the receive buffer of a corresponding one of the ports (source port) of the multi-port bridge. As the packet is still being received, the source port requests a look-up cycle. The source port stores indicia of whether it requested the look-up cycle. During the look-up cycle, the look-up tables are utilized to determine which one or ones of the ports are the appropriate destination ports for the packet, based upon the destination address.

Each of the plurality of ports is assigned a respective one of the signal lines of the communication bus dedicated to communicating data. A product of utilizing the look-up tables is referred to as a bit-map of the destination ports for the packet. The bit-map includes a logic level for each signal line assigned to a port wherein the logic level is indicative of whether the corresponding port is a destination port for the packet.

The bit-map is placed on the data portion of the communication bus. The communication bus is monitored by each port. The source port compares the bit-map to the indicia of whether it requested the look-up cycle. If the source port is designated as a destination port in the bit-map, this indicates that the source and destination nodes are on the same segment of the LAN (intra-segment communication). From the bit map, the source port also determines whether any other port is designated as a destination for the packet. If no other port is designated as a destination, the source port discards the incoming packet, thus filtering the packet. If, however, any other port is also designated as a destination for the packet, the source port continues receiving the packet.

If a port, other than the source port, identified as a destination port for the packet is not currently busy transmitting or receiving another packet, the port configures itself to receive the packet directly from the source port (cut-through). However, if the memory pointer buffer of a destination port is nearly full, the port controller of such destination port applies a jam request signal to the communication bus. The source port receives the jam request and, in response, discards the incoming packet and also sends a jam signal over its associated segment. The jam signal causes the node (source node) which is the source of the packet to discontinue sending the packet and attempt to resend the packet after a waiting period.

Assuming the packet is not discarded, the packet is loaded from the receive buffer of the source port into the packet buffers of the memory starting at the memory address identified in the memory pointer for the packet. Writing of the packet into the packet buffers preferably occurs as the remainder of the packet is still being received into the receive buffer of the source port. In addition, any destination port configured for cut-through receives the packet into its transmit buffer directly from the communication bus simultaneously with the writing of the packet into the packet buffers.

Once the entire packet has been loaded into the packet buffers, the memory pointer is placed on the data lines of the communication bus. Each destination port other than the source port stores the memory pointer in its memory pointer buffer. Thus, the packet is queued for transmission by each destination port. When each destination port is no longer busy, it retrieves the packet from the packet buffers for transmission to its corresponding network segment. busy, it retrieves the packet from the packet buffers for transmission to its corresponding network segment.

DETAILED DESCRIPTION OF A PREFERRED EMBODIMENT

In the preferred embodiment, the present invention is utilized for appropriately directing packets through a multi-port bridge for an Ethernet LAN. It will be apparent, however, that other devices in an Ethernet LAN, such as a switch or a router, or devices in a network operating according to another networking standard, can utilize the advantages of the present invention.

The following documents are hereby incorporated by reference: U.S. Pat. No. 5,884,040, issued Mar. 16, 1999, to Chung and entitled, "PER-PACKET JAMMING IN A MULTI-PORT BRIDGE FOR A LOCAL AREA NETWORK"; U.S. Pat. No. 5,940,597, issued Aug. 17, 1999, to Chung, and entitled, "METHOD AND APPARATUS FOR PERIODICALLY UPDATING ENTRIES IN A CONTENT ADDRESSABLE MEMORY";

U.S. patent application Ser. No. 09/025,355, filed Feb. 18, 1998, and entitled, "MEMORY CONTROLLER IN A MULTI-PORT BRIDGE FOR A LOCAL AREA NETWORK"; and U.S. patent application Ser. No. 09/025,356, filed Feb. 18, 1998, and entitled, "HIGH SPEED BUS STRUCTURE IN A MULTI-PORT BRIDGE FOR A LOCAL AREA NETWORK."

Figure 1:
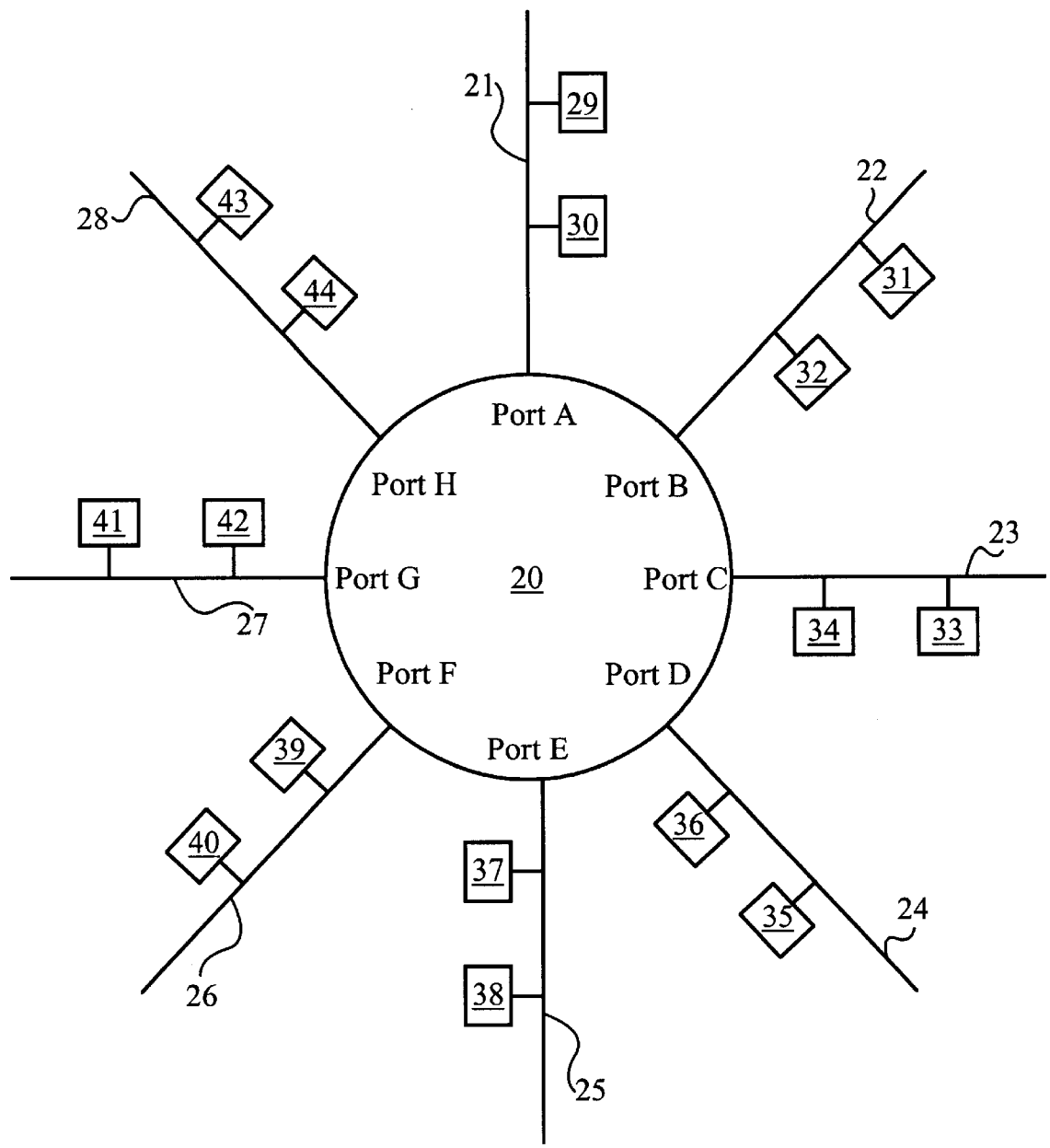
FIG. 1 illustrates a conventional local area network (LAN) including a multi-port bridge.
Figure 2:
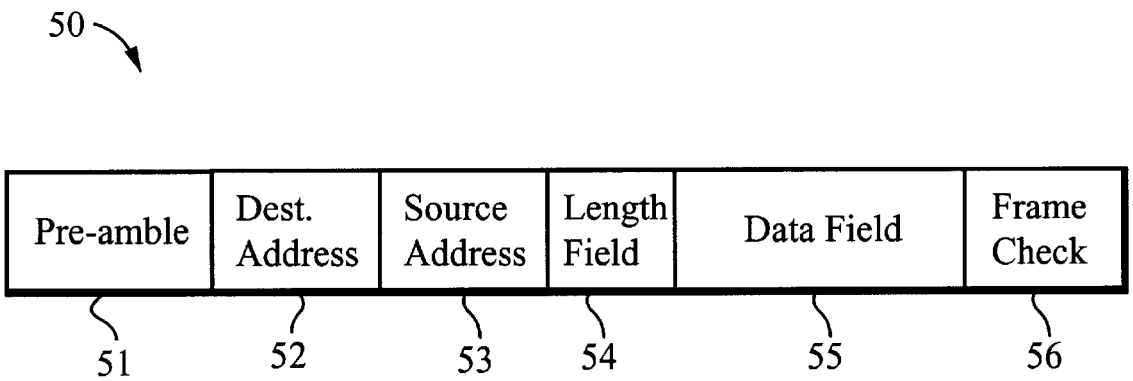
FIG. 2 illustrates a conventional IEEE 802.3 data packet.
Figure 3:
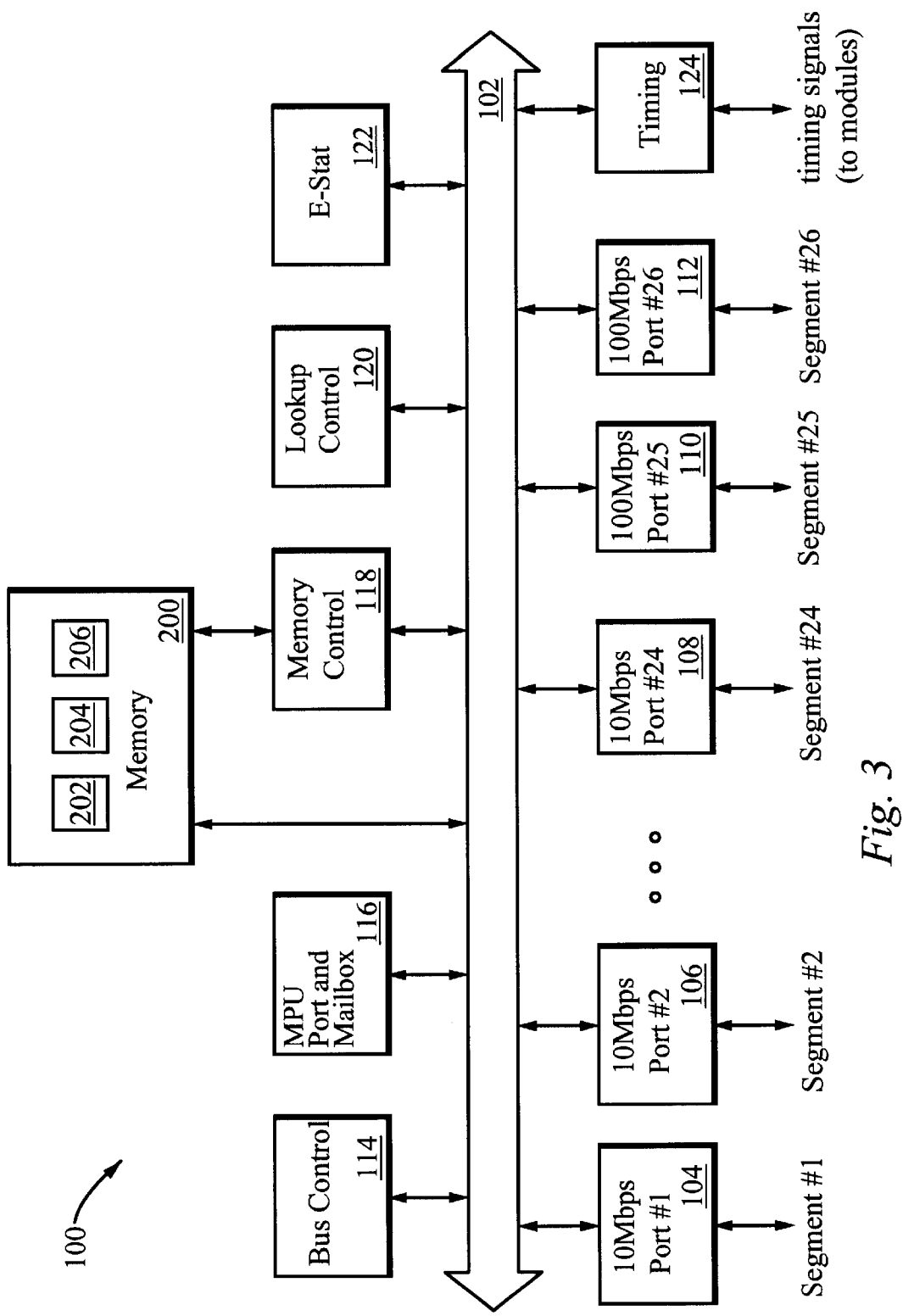
FIG. 3 illustrates a block schematic diagram of a switch engine for a multi-port bridge according to the present invention.

FIG. 3 illustrates a block schematic diagram of a multi-port bridge 100 according to the present invention. A high speed communication bus 102 provides an interconnection for each of the functional blocks 104–124 of the multi-port bridge 100. The communication bus preferably includes five command lines and thirty-two data lines, though it will be apparent that other bus configurations can be utilized. According to the preferred embodiment, twenty-four 10 Mbps ports 104–108 and two 100 Mbps ports 110–112 are each coupled to the communication bus 102 and can be coupled to a respective LAN segment, each LAN segment having one or more nodes. Each of the twenty-four 10 Mbps ports 104–108 transmit and receive data packets at a rate of 10 Mbps, whereas, the two 100 Mbps ports 110–112 transmit and receive data packets at a rate of 100 Mbps. It will be apparent, however, that other numbers of ports, other port configurations and other performance characteristics can be utilized.

A bus control module 114 controls access to the communication bus 102 by collecting requests from the ports 104–112 and from the other modules. Based upon the requests, the bus control module 114 grants access to the communication bus 102 according to an appropriate priority, as explained herein. The bus control module 114 also controls access to a memory device 200 by an external processor 400 (FIG. 7), as explained herein. An MPU port and mailbox module 116 provides an interface between the multi-port bridge 100 and the external processor 400 for performing various functions, as is also explained herein. These functions include loading data into registers of the multi-port bridge 100, reading data from registers of the multi-port bridge 100 and transferring data packets between the external processor 400 and the ports 104–112 of the multi-port bridge 100.

A memory control module 148 provides an interface between the memory device 200 and the communication bus 102 and also provides an interface between the memory device 200 and a look-up control module 120. The memory device 200 includes mailboxes 202 for exchanging information between the external processor and the multi-port bridge 100. In addition, the memory device includes look-up tables 204. The look-up tables 204 include entries which indicate which port of the multi-port bridge 100 is associated with each node of the LAN and also include group addresses for multi-cast packets. The look-up tables 204 are utilized for appropriately directing among the ports 104–112 data packets received by the multi-port bridge 100.

The look-up control module 120 receives addresses of nodes and associated port identifications to be stored in the look-up table 204 from the communication bus 102. The look-up control module 120 also facilitates utilizing the look-up table 204 for directing packets among the ports 104–112 based upon the destination address of each packet. The memory device 200 also includes packet buffers 206 for temporarily storing data packets that are being directed through the multi-port bridge. The memory device 200 is preferably an SDRAM device, though other types of memory devices can be utilized, such as DRAM, SRAM, RAM or EDO. In the case of dynamic memory, the memory control module 118 refreshes the memory device 200 as required.

An E-stat module 122 collects data packet routing statistics and provides them to the external processor 400 for performing analysis and network management functions. A timing module 124 provides timing signals to the ports 104–112 and to the other modules 114–122 of the multi-port bridge 100. Preferably, a primary clock signal cycles at 40 MHz. Other clock signals, at 10 MHz and 25 MHz, are derived from the primary clock signal.

Preferably, the modules 114–124 are each implemented as a finite state machine, though the modules 114–124 can alternately be implemented as one or more processors or controllers operating according to stored software programs. Finite state machines are preferred, however, as they can generally perform the necessary operations faster, thus, resulting in a higher packet handling bandwidth for the multi-port bridge 100.

Figure 4:
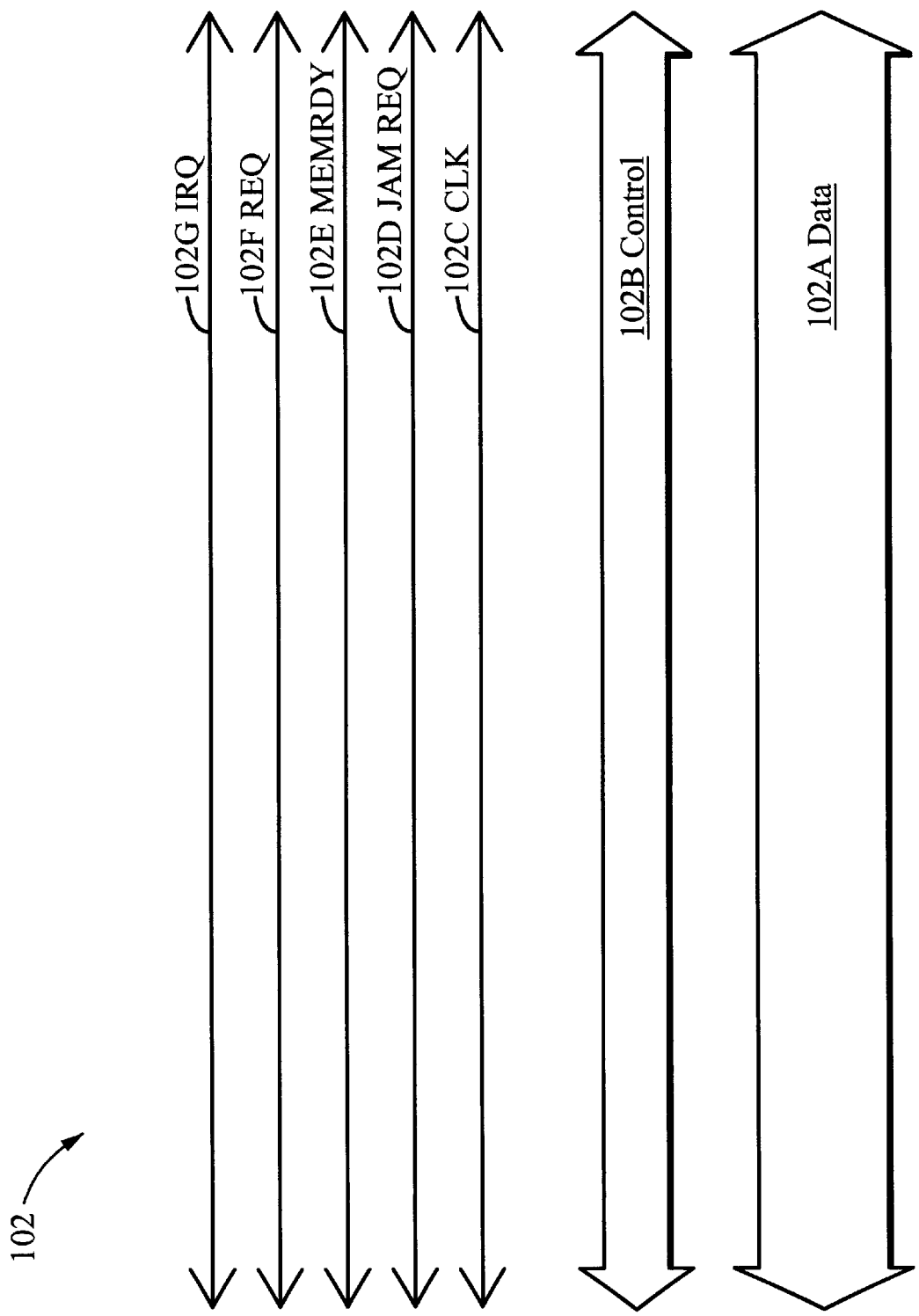
FIG. 4 illustrates a diagram of signal lines included in a high speed communication bus according to the present invention.

FIG. 4 illustrates a diagram of the signal lines included in the high speed communication bus 102 of FIG. 3. The communication bus 102 preferably includes thirty-two data lines 102A, five control lines 102B, a clock CLK line 102C, a jam request JAM REQ line 102D, a memory ready MEMRDY line 102E, a request REQ line 102F and an interrupt IRQ line 102G, though it will be apparent that other bus configurations can be utilized. Table 1 illustrates preferred commands and associated data appearing on the communication bus 102 during operation of the multi-port bridge 100, as explained herein.

TABLE 1

| Control Code | Data 31-24 | 23-0 | Description |
|---|---|---|---|
| 00 Hex | | | transfer in progress/no action |
| 01 | # of transfer | starting memory address | memory read |
| 02 | # of transfer | starting memory address | memory write |
| 03 | source port ID & dest and source addresses | | look-up |
| 04 | signal line of port granted access | | bus-grant-for-REQ |
| 05 | signal lines of all interrupting ports | | poll-interrupt |
| 06 | signal lines of all requesting ports | | poll-request |
| 07 | | | reserved |
| 08 | source port ID & bit-map of all dest ports | | look-up ready |
| 09 | source port ID & dest and source addresses | | look-up (gated with MEMRDY) |
| 0A | | | reserved |
| 0B | | | reserved |
| 0C | register data | | register load |
| 0D | register data | | register read |
| 0E | | | reserved |
| 0F | last transfer (as previously defined) | | bus-release |
| 10 | soure & port ID & dest. port ID | | new packet transfer to memory (cut-through possible) |
| 11 | source port ID & dest. port ID | | cont. packet transfer to memory (cut-through not possible) |
| 12 | # of transfer | memory starting address | write packet header to memory |
| 13 | | | reserved |
| 14 | signal line of port granted access | | bus-grant-for-IRQ |

Referring to Table 1, the Control Codes (commands) applied to the control lines 102B are given as hexadecimal values, while the associated data applied to the data lines 102A and the function performed by each command are described. Because there are five control lines 102B, there can be up to thirty-two different commands (between 00 H and 1F H). As shown in Table 1, however, fewer commands are preferred. Table 1 shows hexadecimal values for the preferred embodiment. It will be apparent, however, that other bit assigmnents and another set of commands can be implemented and still follow the teachings of the present invention.

Figure 5:
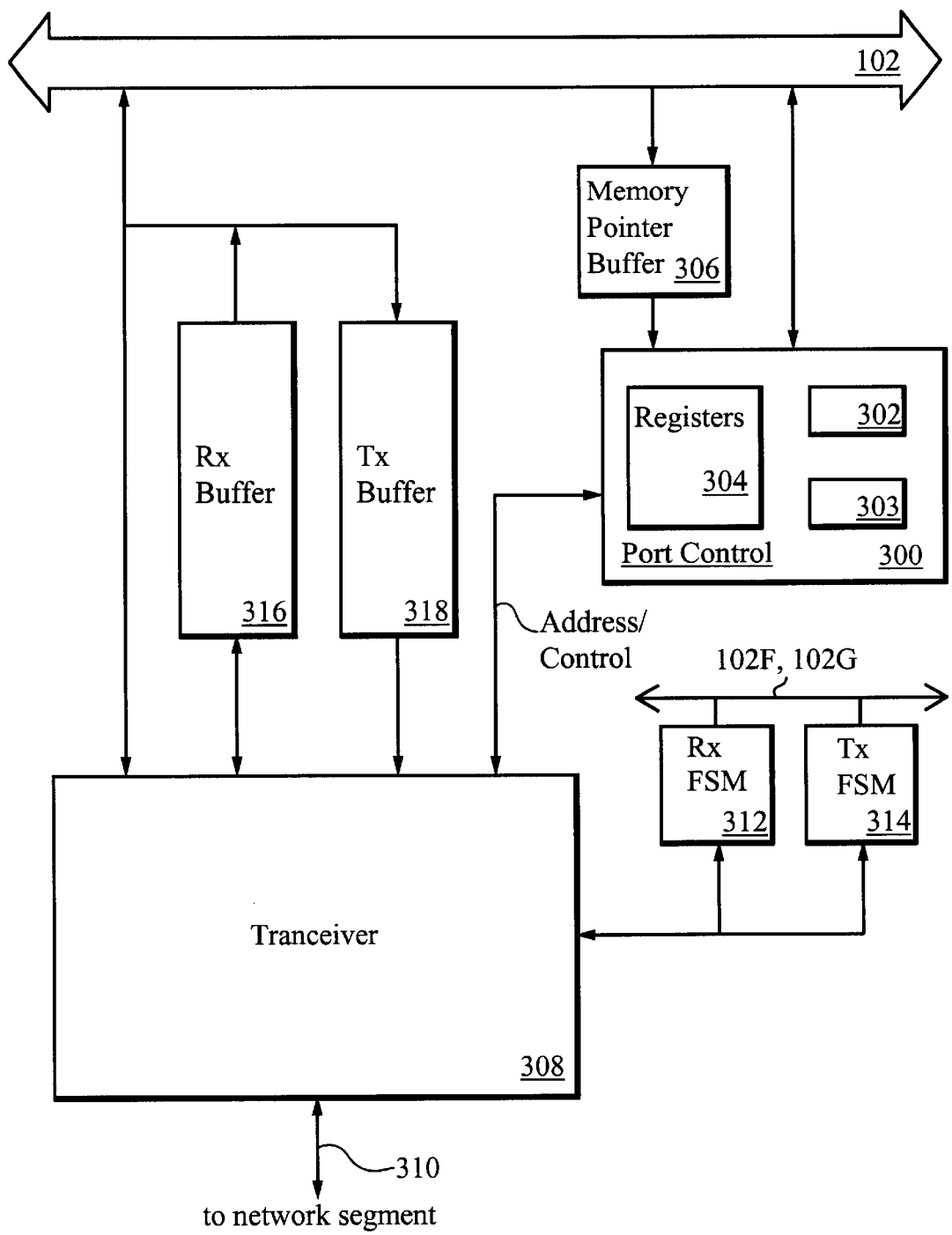
FIG. 5 illustrates a block schematic diagram of a port of the switch engine according to the present invention.

FIG. 5 illustrates a block schematic diagram of one of the ports 104–112 of the multi-port bridge 100 of FIG. 3. A port controller 300, including a bus interface 302, a memory pointer finite state machine (FSM) 303 and registers 304, provides control for the port and an interface between the port and the communication bus 102. The port controller 300 monitors the communication bus 102 for commands and data and also provides commands and data to the communication bus 102 at times when the port has control of the communication bus 102. The registers 304 contain data for configuring the port, initializing the port upon start-up, and for collecting status information for the port. An address latch included in the registers 304 latches addresses from the communication bus 102 and provides them to the transceiver 308. The registers 304 also contain a counter for storing a current state of the finite state machine of the port and registers for storing parameters for use by the finite state machines of the port.

Each port also includes a memory pointer FIFO buffer 306 coupled between the communication bus 102 and the port controller 300. The memory pointer buffer 306 stores memory pointers (explained herein) for data packets being queued in the packet buffers 206 (FIG. 3) of the memory device 200. Preferably, the memory pointers each have a predefined length. In addition, the memory pointer buffer 306 preferably holds 128 memory pointers, though it will be apparent that another capacity for the memory pointer buffer 306 can be selected.

The port also includes a medium access control (MAC) transceiver 308 which accesses a LAN segment 310 for transmitting and receiving data packets to and from the LAN segment 310. Associated with and coupled to the transceiver 308 are a receive finite state machine 312, for controlling the transceiver 308 during packet reception, and a transmit finite state machine 314, for controlling the transceiver 308 during packet transmission.

Packets received from the network segment 310 by the transceiver 308 are directed to the communication bus 102 through a receive FIFO buffer 316, while packets to be transmitted over the LAN segment 310 are directed from the communication bus 102 to the transceiver 308 through a transmit FIFO buffer 318. Preferably, the receive buffer 316 holds 128 bytes while the transmit buffer 318 holds 256 bytes, though other capacities can be selected. Note that an IEEE 802.3 data packet can include up to 1500 bytes of data in addition to the source address, the destination address and the frame check field. Thus, in the preferred embodiment, neither the receive buffer 316, nor the transmit buffer 318 is capable of storing a entire IEEE 802.3 data packet of the maximum size. The receive finite state machine 312 and the transmit finite state machine 314 are each coupled to the bus control module 114 (FIG. 3) for initiating access to the communication bus 102 by the port.

Access to the communication bus 102 is obtained in the following manner. The bus control module 114 monitors the interrupt IRQ line 102G and the request REQ line 102F. A port requiring access to the bus 102 raises the IRQ line 102G or the request REQ line 102F, depending upon the circumstances. The bus control module 114 grants access to the bus 102 according to an appropriate priority. Preferably, an interrupt IRQ is granted access to the bus 102 according to a higher priority than a request REQ. Ports having a higher data rate have a higher priority than ports having a lower data rate. For example, the 100 Mbps ports 110–112 have a higher priority than the 10 Mbps ports 104–108. Further, assuming equal data rates, a port serviced more recently has a lower priority than a port serviced less recently. Copending application entitled, "Dual Priority Chain for Data Communication Ports in a Multi-Port Bridge for a Local Area Network," filed on the same day as the present application, describes a technique for prioritizing the interrupts (IRQ) and requests (REQ) and is hereby incorporated by reference.

When the bus is available after receiving an interrupt IRQ, the bus control module 114 responds to the interrupt IRQ by placing a poll-interrupt command 05 H (Table 1) on the control lines 102B of the bus 102. While the poll-interrupt command 05 H is on the control lines 102B, each port having a pending interrupt IRQ raises a corresponding one signal line of the data lines 102A. For this purpose, each of the ports 104–112 and the MPU port and mailbox 116 are assigned a respective one signal line of the data lines 102A. Accordingly, the bus control module 114 discovers which of the ports has a pending interrupt by monitoring the data lines 102A while the poll-interrupt command 05 H is active. The bus control module 114 then grants access to the bus 102 in according to appropriate priority by placing a bus-grant-for-IRQ command 14 H (Table 1) on the control lines 102B of the bus 102 and also raises the respective one signal line of the data lines 102A that corresponds to the port being granted access to the bus 102. Upon being granted access to the bus 102, the designated port then has control of the bus 102.

Similarly, when the bus 102 is available after receiving a request REQ, the bus control module 114 places a poll-request command 06 H (Table 1) on the control lines 102B of the bus 102. While the poll-request command 06 H is on the control lines 102B, each port having a pending request REQ raises its corresponding one signal line of the data lines 102A. The bus control module 114 discovers which of the ports has a pending request by monitoring the data lines 102A while the poll-request command 06 H is active. The bus control module 114 then grants access to the bus 102 according to an appropriate priority by placing a bus-grant-for-REQ command 04 H on the control lines 102B of the bus 102 and also raises the one signal line of the data lines 102A that corresponds to the port being granted access to the bus 102. Upon being granted access to the bus 102, the designated port then has control of the bus 102.

Packet flow through the multi-port bridge 100 occurs in the following manner. A data packet, such as an IEEE 802.3 data packet, originating from a node (source node) in a segment of the local area network is received by a corresponding one of the ports 104–112 (source port) of the multi-port bridge 100 (FIG. 3). The receive buffer 316 in the source port receives the data packet as the packet is being received by the transceiver 308 in the source port from the network segment associated with the source port. After the first twelve bytes, corresponding to the source address and the destination address for the packet, are received by the source port, the receive finite state machine 312 requests a look-up cycle from the bus control module 114 (FIG. 3) by raising the interrupt line IRQ. The bus control module 114 monitors such requests, discovers the requesting port(s) via the poll-interrupt command 05 H and grants each request according to an appropriate priority via the bus-grant-for IRQ command 14 H, as explained above.

The source port stores indicia of whether it was granted access to the bus 102 for performing a look-up cycle. As explained herein, the indicia is utilized by the port later to determine whether the packet is to be filtered. Preferably, the indicia is obtained by storing the logic levels of the data lines 102A during the bus-grant-for-IRQ command 14 H. As explained above, during the bus-grant-for-IRQ command 14 H, the signal line corresponding to the source port is raised.

Upon obtaining access to the bus, the source port places a look-up command 03 H (Table 1) on the control lines 102B. During successive clock cycles while the look-up command 03 H is active, an identification of the source port, the destination node address from the packet and the source node address from the packet are transferred from the source port to the look-up control module 120 (FIG. 3) via the data lines 102A. The source port identification, destination address and source address are transferred over the communication bus 102 in segments that are each four bytes long as this corresponds to the width (32 bits) of the data lines 102A of the communication bus 102. Preferably, this transfer is completed in four clock cycles. It will be apparent, however, that the communication bus 102 can have a different number of data lines, in which case, a different number of bytes can be transferred at a time.

Once the look-up control module 120 has received the source port identification, the destination address and the source address for the packet, the look-up control module 120 so notifies the memory control module 118 (FIG. 3). The memory control module 118 and lookup control module 120 then update the look-up tables 204 (FIG. 3) by ensuring that the source node address for the packet is stored in the look-up tables 204 in association with the source port identification for the packet. This ensures that the look-up tables 204 accurately reflect any changes that may have occurred in the network (this is referred to as a learning cycle). The information stored during the learning cycle is utilized for directing subsequent packets.

Once the learning cycle is complete, the memory control module 118 and the look-up control module 120 utilize the look-up tables 204 to determine which port (destination port) is associated with the destination address for the packet (look-up cycle). If the packet is a multi-cast packet (multiple destination ports) or a broadcast packet (all ports except the source port are destination ports), the look-up control module 120 determines which are the multiple destination ports for the packet. Once the look-up cycle is complete, the look-up control module 120 places a look-up ready command 08 H (Table 1) on the control lines 102B of the bus 102 and, while the look-up ready command 08 H is active, the look-up control module 120 raises the respective signal lines of the data lines 102A of all the ports 104–112 which are determined to be destination ports for the packet. One signal line each corresponds uniquely with one of the ports 104–112.

Figure 6:
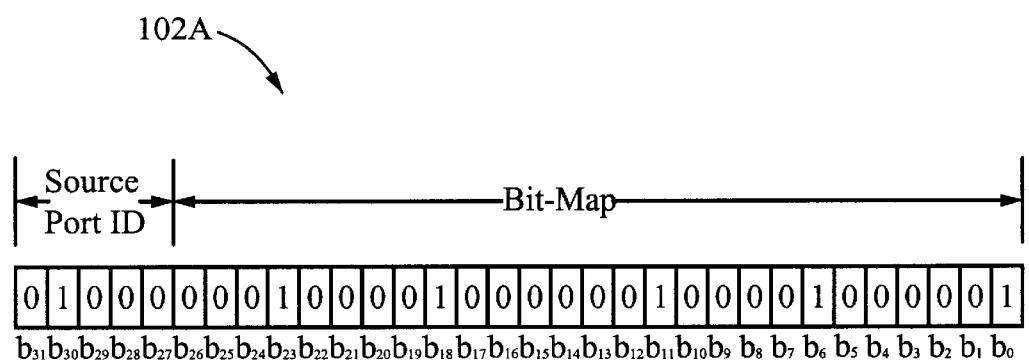
FIG. 6 illustrates a bit-map of the destination ports appearing on the high speed communication bus during a look-up ready command according to the present invention.

This raising of the respective signal lines is referred to as a bit-map of the destination ports. FIG. 6 illustrates logic levels for each of the thirty-two data lines 102A, of the bus 102 during the look-up ready command 08 H. Each one of the twenty-six ports 104–112 and the external processor 400 are assigned to a respective one of the signal lines $b_0$–$b_{31}$. Thus, for example, the external processor 400 is assigned to signal line $b_{26}$, while port #1 is assigned to signal line $b_0$, port #2 is assigned to signal line $b_1$, port #3 is assigned to signal line $b_2$, and so forth, with port #26 assigned to signal line $b_{25}$. In the preferred embodiment, signal lines $b_{27}$–$b_{31}$ are not included in the bit-map. Rather, the signal lines $b_{27}$–$b_3$, identify the source port. A multi-port bridge, however, could include more or fewer ports, in which case, the bit assignments would be different.

Assume that the look-up cycle for a packet having port #9 as its source port determines that the packet is multi-cast having destination nodes associated with destination ports #1, #7, #12, #19 and #24. Therefore, during the look-up ready command 08 H, the bit-map of the destination ports will include logic one's for signal lines $b_0$, $b_6$, $b_{18}$, and $b_{23}$; signal lines $b_{27}$–$b_{31}$ identify port #9 as the source port; and the remaining signal lines $b_{1–b5}$, $b_7$, $b_9$–$b_{10}$, $b_{12}$–$b_{17}$, $b_{19}$–$b_{22}$ and $b_{24}$–$b_{26}$ are logic zeros.

Each port monitors the communication bus 102 for the look-up ready command 08 H appearing on the control lines 102B and the associated bit-map of the destination ports appearing on the data lines 102A. The bit-map allows each destination port for the packet to be simultaneously notified of its status as a destination port. If the source port for the packet is also designated as the only destination port for the packet during the look-up ready command 08 H, this indicates that the destination node for the packet is in the same network segment as the source node (intra-segment communication). As such, the source port should not retransmit the packet because the destination node would have already received the packet at the same time that the source port received the packet. When this occurs and the packet has a single destination, the packet is filtered. To filter the packet, the source port preferably takes no further action relative to the packet.

From the bit map, the source port also determines whether any other port is designated as a destination for the packet. This is accomplished, for example, by the source port determining whether a signal line assigned to any port other than the source port is raised. If the source port is the only port that is designated as a destination by the bit-map (uni-cast and intra-segment packet), the source port immediately filters the incoming packet. To filter the packet, the source port preferably takes no further action relative to the packet. Thus, the packet is discarded when a next packet overwrites the filtered packet in the receive FIFO 316. If, however, any other port is also designated as a destination for the packet (multi-cast or broadcast packet), the source port continues receiving the packet so that it can be forwarded to such other port.

If any destination port having its signal line raised during the look-up ready command 08 H has a memory pointer buffer 306 that is full or nearly full, such destination port raises the JAM REQ line 102D (FIG. 4) while the look-up ready command 08 H is still active. During the look-up ready command 08 H, the source port monitors the JAM REQ line 102D for such a jam request. In response to a jam request, the source port discards the incoming packet and also sends a jam signal over its associated segment. The jam signal will cause the node (source node) which is the source of the packet to discontinue sending the packet and attempt to resend the packet after a waiting period.

Once the look-up ready command 08 H is no longer active, the source port for the packet places a bus-release command 0F H (Table 1) on the control lines 102B of the data bus 102. This releases control of the bus 102 by indicating to the bus control module 114 that the bus is available.

The bus control module 114 then responds to any pending interrupts or requests for access to the bus 102 by granting access to the bus according to an appropriate priority. Thus, while the packet is still being received by the source port, but after the determination is made whether to filter or jam the incoming packet, the bus 102 can be utilized for other purposes.

Meanwhile, returning to the example, the packet continues being received by the source port. Once 64 bytes of the packet have been received, the source port requests access to the bus again, this time by raising the REQ line 102F. The bus control module 114 grants access to the source port according to an appropriate priority by placing a bus-grant-for-REQ command 04 H on the control lines 102B and raises the signal line corresponding to the source port.

The packet buffers 206 include a space allocated to each port for storing packets received by the port. Each port controller 300 keeps track of the space allocated to the port and determines a location in the packet buffers 206 for each packet received by the port. Preferably, the packets are written into the allocated space in a circular fashion; each new packet overwrites portions of the oldest packet in the allocated space.

The source port initiates a series of memory write cycles for loading the packet from the receive buffer 316 of the source port into the allocated space in the packet buffers 206 by first placing a new packet transfer command 10 H (Table 1) on the control lines 102B and by placing the source port identification and the bit-map for the destination ports on the data lines 102A (raising the signal lines corresponding to each destination port for the packet). If any destination port having its signal line raised during new packet transfer command 10 H is not currently busy transmitting or receiving another packet, such destination port configures itself to receive the packet directly from the source port (cut-through). Destination ports that are currently busy ignore the packet for now and retrieve the packet from the packet buffers 206 later, when they are no longer busy.

Following the new packet transfer command 10 H, the source port places a memory write command 02 H (Table 1) on the control lines 102B of the bus 102. During a first bus clock cycle while the memory write command 02 H is active, the source port places on the data lines 102A one byte of information which indicates the number of bus cycles which will be required to complete the entire transfer. The number of bus cycles depends upon how much of the packet was received in the source port while the source port awaited access to the bus 102. Also during the first bus clock cycle while the memory write command 02 H is active, the source port places on the data lines 102A three bytes of information which indicates a starting address within the packet buffers 206 for the memory write cycles. The memory control module 118 receives this information for performing the memory write operation.

Simultaneously with the writing of the packet into the memory buffers 206, each destination port configured for cut-through receives the packet directly from the bus 102 into its transmit FIFO 318 and immediately begins transmitting the packet to the appropriate destination node on its associated network segment under control of its transmit finite state machine 314. The destination node for the packet then begins to receive the packet from the network segment.

In subsequent bus clock cycles while the memory write command 02 H is active, the source port places the packet on the data lines 102A in four byte portions (corresponding to the width of the data lines 102A), one portion for each clock cycle, until the memory write operation is completed. Simultaneously, destination ports configured for cut-though continue to receive the packet and continue to transmit the packet to their associated network segment. When the memory write operation is completed, the source port releases the bus via the bus-release command OF H.

Once the next 64 bytes of the packet is received by the source port, the source port again requests access to the bus 102 by raising the REQ line 102F and initiates a next memory write operation for loading the packet into the packet buffers 206. The source port first places a continuation packet transfer command 11 H (Table 1) on the control lines 102B and, while the continuation packet command 10 H is active, the source port places the bit-map for the destination ports on the data lines 102A (raises the signal lines corresponding to each destination port for the packet). Only those destination ports having their signal lines raised and that had already been receiving the packet directly from the source port (those destination ports configured for cut-through) will continue to receive the next installment of the packet directly from the source port. Other destination ports will continue to ignore the packet. This is true even if a destination port that was busy during the new packet transfer command 11 H has become available because such a port would not have obtained the first installment of the packet. Then, the source port places the memory write command 02 H on the data lines 102A and places one byte of information indicating the number of bus cycles required and three bytes indicating the starting address for this write operation. Then, the port releases the bus via the bus-release command OF H. This process repeats, including requesting access to the bus and placing the continuation packet transfer command 10 H on the bus 102, for each successive 64 byte portion of the packet until the entire packet is loaded into the packet buffers 206. Because writing of the packet in the packet buffers 206 preferably occurs as the remainder of the packet is still being received into the receive buffer 316 of the source port, the receive buffer 316 for each port need not be capable of storing an entire data packet.

The packet is preferably loaded into the packet buffers 206 a predetermined offset from an assigned starting address. This provides a location for storing a header for the packet once the packet has been completely loaded into the packet buffers 206. For example, the header includes an identification number assigned to the packet, an indication of the destination ports for the packet, the receive status for the packet, the length of the packet, the source node address for the packet and the destination node address for the packet. The receive status indicates whether or not the entire packet has been successfully received and is loaded into the packet buffers 206. Preferably, the header is eight bytes long, though it will be apparent that another length can be selected for the header.

After the last data is transferred such that the entire packet has been stored in the packer buffers 206, the source port retains control of the bus 102 and stores the header for the packet in the packet buffers 206. This is accomplished by the source port placing a packet header command 12 H on the control lines 102B. During a first clock cycle while the packet header command 12 H is active, the source port places one byte of information indicating the number bus clock cycles required to write the entire header into the memory buffers 206 and places three bytes of information indicating the assigned starting address for the packet.

During successive bus clock cycles, the header is written into the packet buffers beginning at the assigned starting address.

Each port monitors the communication bus 102 for the packet header command 12 H. While the packet header command 12 H is active, each port receives the packet header information. Each port which is identified as a destination port in the packet header checks the receive status for the packet and, if the packet was successfully received and stored in the packet buffers 306, each destination port stores a memory pointer, including at least the assigned starting address for the packet in its memory pointer buffer 306. Preferably, the destination port also stores the identification number assigned to the packet in the memory pointer buffer 306 along with the assigned starting address for the packet. If the receive status indicates an error, however, the starting address in the packet buffers is not stored and no further action is taken by the destination ports relative the packet. Finally, the source port releases control of the bus 102 via the bus release command OF H. This completes the actions taken by the source port relative the packet.

The source port for the packet, however, does not store the memory pointer for the packet during the packet header command 12 H when the source port places the packet header information on the communication bus 102. Therefore, when the bit-map for a multi-cast packet includes the source port as a destination port, such a packet will not be retransmitted by the source port.

Each port monitors its memory pointer buffer 306 and initiates retrieval of packets from the packet buffers 206. Thus, returning to the example packet, as soon as the destination port becomes available, it removes the identification number for the packet and the assigned starting address for the packet from its memory pointer buffer 306. Then, the destination port requests access to the bus by raising the request line REQ. Once the bus control module grants access to the bus 102, via the bus-grant-for-REQ command 04 H, the destination port first retrieves the header for the packet from the packet buffers 206. Thus, the destination port initiates a read operation by placing a memory read command 01 H (Table 1) on the control lines 102B of the bus 102. During a first clock cycle while the memory read command 01 H is active, the destination port places on the data lines 102A of the bus 102 one byte of information indicating the number of bus clock cycles for the read operation (e.g. the number of transfers required to retrieved the header) and three bytes of information indicating the assigned starting address for the packet.

Once the packet header is retrieved from the packet buffers 206, the destination port checks the packet identification number that is included in the header retrieved. If the packet identification number retrieved from the packet buffers 206 does not match the packet identification number stored in the memory pointer buffer 306, this indicates that the packet became corrupted in the packet buffers 306 after it was stored. For example, if a portion of the packet was overwritten by a later packet, the identification number will also be overwritten, such that it does not match the identification number stored in the memory pointer buffer 306 of the destination port. In addition, the destination port obtains the length of the packet so that it can determine the appropriate number of memory read cycles that will be required to transfer the entire packet.

While the destination port is retrieving the packet from the packet buffers 206, the destination port simultaneously transmits the packet to its associated segment under control of the transmit finite state machine 314. For this reason, the transmit FIFO 318 in each port need not be capable of storing more than a single packet of the maximum length. Preferably, the packet is retrieved from the packet buffers 206 in multiple installments until the entire packet has be retrieved from the packet buffers 206. An installment is initiated each time the transmit FIFO 318 is nearly empty. Each installment is retrieved by the destination port obtaining access to the bus 102; placing a memory read command 01 H on the bus 102 while specifying a number of memory transfers required for the installment; and releasing the bus via the bus release command OF H after performing the specified number of transfers. Accordingly, the transmit FIFO 318 preferably need not be capable of storing a packet of maximum length. Because the bus 102 is released between installments, other ports can access the bus for other purposes simultaneously with the destination port transmitting the packet to its associated network segment.

In the event that a cut-through or transmit operation was initiated, but was unsuccessful, the packet will need to be retransmitted by the destination port. For example, the cut-through or transmit operation may have been unsuccessful if a data collision occurred during transmission of the packet over the segment associated with the destination port. In such case, the packet is retrieved from the packet buffers 206 as described above and retransmitted by the destination port.

While the destination port is receiving the packet into its transmit buffer 318 from the packet buffers 206, the destination port begins transmitting the packet to the LAN segment associated with the destination port. The packet is then received from the network segment by the destination node for the packet.

Thus, if the destination port is configured for cut-through, the destination port receives the packet into its transmit buffer 318 directly from the communication bus 102 simultaneously with the write cycles for loading of the packet into the packet buffers 206. During such a cut-through operation, the packet is received into the transmit buffer 318 of the destination port for immediate transmission to the LAN segment associated with the destination port. If the packet is a broadcast or multi-cast packet, one or more of the destination ports can receive the packet directly from the source port, while one or more other destination ports for the packet can retrieve the packet from the packet buffers 206 once those destination ports are no longer busy.

The memory pointers stored in the memory pointer buffer 306 of each port are preferably of a uniform size. Therefore, the exact number of memory pointers that can be accommodated by a memory pointer buffer 306 of a port can be determined from the amount of space available in the memory pointer buffer 306 of the port. Accordingly, unlike prior arrangements, extra space does need to be provided in the port to accommodate a data packet having an unknown length. According to the present invention, however, the jam request (raising the JAM REQ line) is preferably generated by a destination port for a packet when the memory pointer buffer 306 in the port is nearly full, but has space available to store several memory pointers (e.g. ten). This provides the destination port an ability to store memory pointers for packets which are in the process of being loaded into the packet buffers 206. The memory pointer buffer 306 in each port is preferably sized relative to the associated packet buffers 206 in the memory device 200 such that there is only a small possibility that the packet buffers 206 will become full before any memory pointer buffer 306 becomes full. For example, because each port can hold up to 128 memory pointers, the packet buffers 206 can preferably accommodate 128 data packets of the maximum size for each port. In practice, the packet buffers 206 can be somewhat smaller because not every packet is expected to have the maximum size.

In an alternate embodiment of the present invention, rather than discarding packets in the source port when the source port is the only destination port for the packet (uni-cast and intra-segment packet), such packets are transferred to the packet buffers 206. These packets are not retrieved from the packet buffers 206, however, because the source port does not store a memory pointer for such packets. This embodiment is less preferred, however, because bandwidth of the bus 102 is utilized to store such packets unnecessarily.

Figure 7:
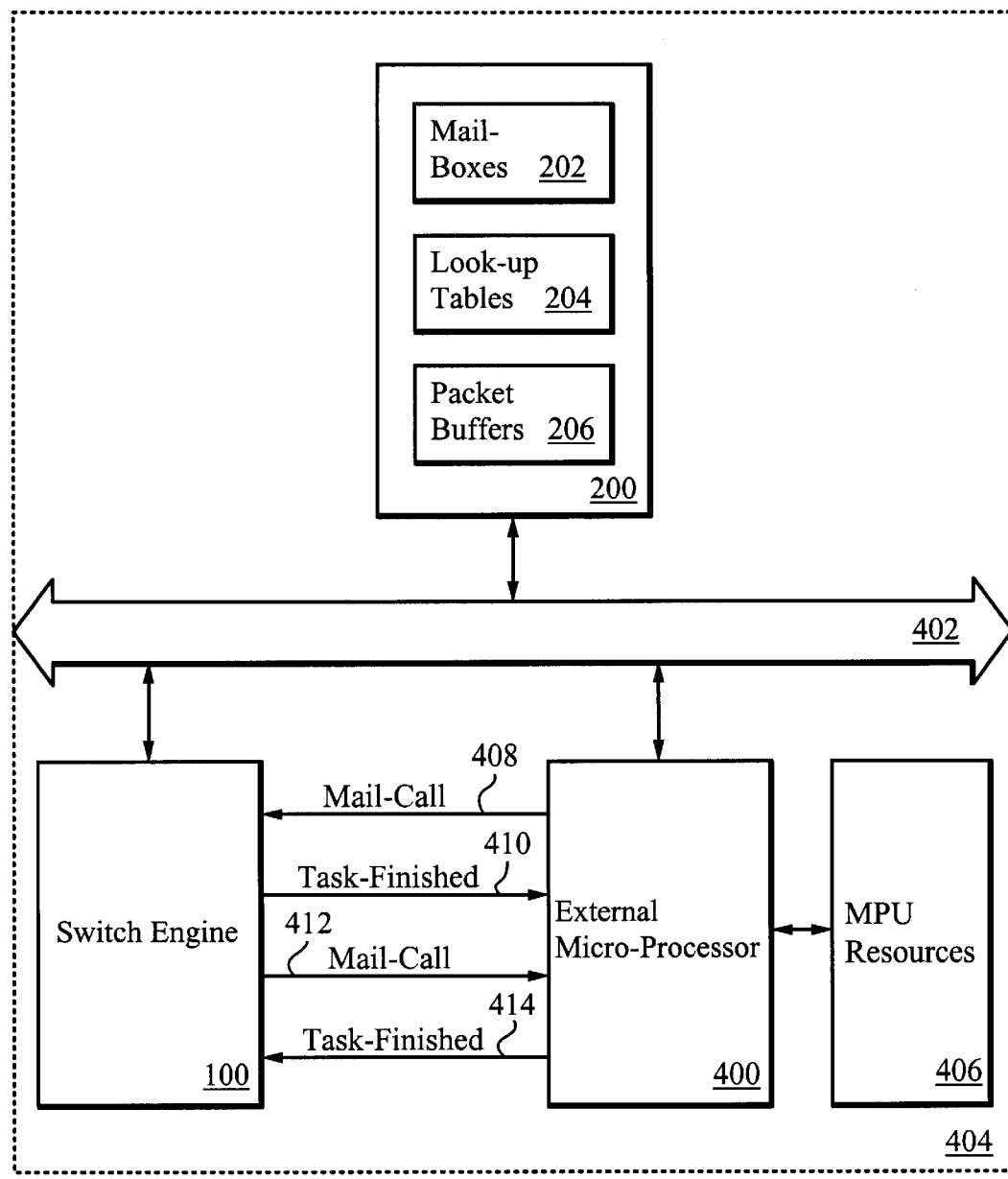
FIG. 7 illustrates a block schematic diagram of the switch engine, a memory device and an external processor according to the present invention.

FIG. 7 illustrates a block schematic diagram of the multi-port bridge 100, the memory device 200 and an external processor 400 according to the present invention. A memory bus 402 interconnects the multi-port bridge 100 and the external processor 400 to the memory device 200. Preferably, access to the memory device 200 by the multi-port bridge 100 and the external processor 400 is implemented by a multiplexer included as part of the memory bus 402 and which multiplexor is controlled by the multi-port bridge 100. The multi-port bridge 100, including the communication bus 102 (FIG. 3), is preferably implemented as an integrated circuit mounted to a printed circuit board 404. The memory device 200 and the external processor 400 are also mounted to the printed circuit board 404.

As described above in reference to FIGS. 3–6, the bridging and filtering functions of the multi-port bridge are performed primarily by the multi-port bridge 100 and the buffer memory 200. Because the multi-port bridge 100 is preferably implemented as a number of finite state machines interconnected via the communication bus 102, the multiport bridge 100 provides a high bandwidth capacity for directing data packets through the multi-port bridge. Thus, according to the present invention, the external processor 400 is provided to perform tasks in support of the functioning of the multi-port bridge 100. These functions include: providing a communication port for enabling the nodes of the LAN to communicate with nodes of a dissimilar LAN or a WAN and for enabling the nodes of the LAN to communicate with a file server for the LAN; providing parameters for initializing registers of the switch engine via a register load command 0C H (Table 1); collecting data from the LAN for performing network management functions via a register read command 0D H (Table 1); and providing services to the multi-port bridge 100. The mailbox interface according to the present invention allows the external processor 400 to provide these functions without the need to dedicate a large number of pins of the integrated circuit package to such an interface.

Preferably, the external processor 400 is implemented as a reduced instruction set computer (RISC) to improve speed performance. The external processor 400 can have its own dedicated resources 406, such as memory for storing operating software for the external processor 400 and for use by the external processor 400 as a scratch pad. In addition, when the external processor 400 performs the functions of a file server for the LAN, the resources 406 can include a mass storage device for storing application programs and data files which is accessible by the external processor 400. Also, when the external processor 400 performs the function of providing an interconnection of the LAN to a dissimilar LAN or to a WAN, the resources 406 can include a communication device, such as a telephone modem, an integrated services digital network (ISDN) interface, a T1 media interface or a T3 media interface which is accessible by the external processor 400. In addition, multiple external processors 400 can be coupled to the memory bus 402. In such case, additional resources can be provided for such multiple external processors, such as one or more mass storage devices and/or one or more communication devices.

When a packet is originated by the external processor 400, the destination address and source address for the packet are placed in the memory 200 by the external processor 400. Thus, rather than obtaining the destination and source addresses from the source port, the destination and source addresses are obtained from the memory 200. The memory control module 118 places a look-up gated with MEMRDY command 09 H on the control lines 102B of the bus 102, retrieves the destination address and source address from the memory 200, and places them on the data lines 102A. As with the look-up command 03 H, transfer of the destination and source addresses is performed over several bus clock cycles. The look-up control module 120 responds to the look-up gated with MEMRDY command 09 H by waiting until the MEMRDY line 102E is raised to a logic high voltage level before beginning to receive the destination and source addresses for performing a look-up cycle. This ensures that the destination and source addresses appearing on the data lines 102A are valid before the look-up control module 120 receives them.

The memory pointers stored in the memory pointer buffer 306 of each port are preferably of a uniform size. Therefore, the exact number of memory pointers that can be accommodated by a memory pointer buffer 306 of a port can be determined from the amount of space available in the memory pointer buffer 306 of the port. Accordingly, unlike prior arrangements, extra space does need to be provided in the port to accommodate a data packet having an unknown length. According to the present invention, however, the jam request (raising the JAM REQ line) is preferably generated by a destination port for a packet when the memory pointer buffer 306 in the port is nearly fill, but has space available to store several memory pointers (e.g. ten). This provides the destination port an ability to store memory pointers for packets which are in the process of being loaded into the packet buffers 206. The memory pointer buffer 306 in each port is preferably sized relative to the associated packet buffers 206 in the memory device 200 such that there is only a small possibility that the packet buffers 206 will become fill before any memory pointer buffer 306 becomes full. For example, because each port can hold up to 128 memory pointers, the packet buffers 206 can preferably accommodate 128 data packets of the maximum size for each port. In practice, the packet buffers 206 can be somewhat smaller because not every packet is expected to have the maximum size.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A multi-port bridge for interconnecting a plurality of segments of a local area network, the multi-port bridge comprising:

a) a communication bus having a plurality of signal lines;

b) a plurality of ports coupled to the communication bus, each port for receiving data packets from a corresponding segment of the local area network and for transmitting data packets bridged by the multi-port bridge to the corresponding segment, wherein each signal line from among the plurality of signal lines is assigned to a respective port among the plurality of ports; and c) a control circuit coupled to the communication bus, wherein the control circuit determines which of the plurality of ports are a destination for each packet based upon a destination address contained in the packet and wherein the control circuit notifies a source port for each packet whether the source port is also a destination for the packet by applying a selected logic level to the signal line of the source port and, if the source port is also a destination for the packet, the packet is not transmitted by the source port to its corresponding segment.

2. The multi-port bridge according to claim 1 wherein the control circuit notifies the source port whether it is a destination for the packet while the packet is still being received by the multi-port bridge.

3. The multi-port bridge according to claim 2 wherein if the source port is a destination for the packet, then the packet is discarded while the packet is still being received by the multi-port bridge.

4. The multi-port bridge according to claim 1 wherein the control circuit notifies the source port for the packet whether any port other than the source port is also a destination for the packet by applying a selected logic level to each signal line corresponding to each other port.

5. The multi-port bridge according to claim 4 wherein if the source port is an only destination for the packet, then the packet is discarded and, if the source port is one of a plurality of destinations for the packet or if the source port is not a destination for the packet, then the entire packet is received.

6. The multi-port bridge according to claim 5 wherein the packet is discarded while it is being received.

7. The multi-port bridge according to claim 5 wherein the entire packet is received by the source port transferring the entire packet to a memory device.

8. The multi-port bridge according to claim 7 wherein the entire packet is transferred to the memory device while it is being received.

9. A method of controlling flow of packets in a multi-port bridge having a plurality of ports interconnected to a memory device by a communication bus comprising a plurality of signal lines, wherein each port of the plurality of ports is associated with a respective signal line, and wherein the multi-port bridge functions to interconnect a plurality of segments of a local area network, the method comprising steps of:
   a) receiving a packet having a destination address into a receive buffer in the source port, wherein the packet is received from a segment associated with the source port;
   b) looking-up the destination address in a table for determining one or more destination ports for the packet;
   c) forming a bit-map for the packet, wherein individual bits of the bit map are correlated to respective ports, a logic level of each bit reflecting a status of each the plurality of ports, the status indicating whether or not a port is designated as a destination port according to the destination address within the packet;
   d) placing the bit-map on the communication bus such that respective logic levels applied to the plurality of signal lines within the bus conform to the respective logic levels of the bit map;
   e) determining whether the source port is a destination for the packet; and
   f) performing the step of preventing the source port from transmitting the packet to its corresponding segment if the source port is a destination for the packet.

10. The method according to claim 9 wherein the step of determining comprises steps of:
   a. transferring the destination address to a control circuit; and
   b. comparing the destination address to entries in a table.

11. The method according to claim 9 wherein the step of preventing comprises a step of discarding the packet is while the packet is still being received by the multi-port bridge.

12. The method according to claim 9 further comprising a step of transferring the packet to an assigned location in the memory device.

13. The method according to claim 12 further comprising a step of storing indicia of the assigned location in the one or more destination ports, other than the source port.

14. The method according to claim 13 further comprising a step of retrieving the packet from the location into at least one of the destination ports for the packet having the indicia stored.

15. The method according to claim 9 wherein if the source port is an only destination for the packet, then the packet is discarded and, if the source port is one of a plurality of destinations for the packet or if the source port is not a destination for the packet, then the entire packet is received.

16. The method according to claim 15 wherein the packet is discarded while it is being received.

17. The method according to claim 15 wherein the entire packet is received by the source port performing a step of transferring the entire packet to an assigned location in the memory device.

18. The method according to claim 17 wherein the step of transferring the entire packet to the assigned location is performed while the packet is being received.

19. The method according to claim 17 further comprising a step of storing indicia of the assigned location in the one or more destination ports, other than the source port.

20. The method according to claim 19 wherein the indica includes an identification assigned to the packet and an address in the memory device representative of the location.

21. The method according to claim 17 further comprising a step of retrieving the packet from the location into at least one of the destination ports for the packet having the indicia stored.

22. The method according to claim 21 further comprising a step of transmitting the packet while the packet is being retrieved from the location.

23. The method according to claim 21 further comprising a step of receiving the packet from the source port into at least one of the destination ports for the packet while the packet is being stored at the location.

24. The method according to claim 23 further comprising a step of retrieving the packet from the location into at least one of the destination ports for the packet after the packet has been stored at the location.

25. A method of controlling flow of packets in a multi-port bridge having a plurality of ports configured to communicate with a respective plurality of segments, the multiport bridge further comprising a communication bus comprising a plurality of signal lines, each of the plurality ports being assigned to a respective signal line from among the plurality of signal lines, the method comprising steps of:
   a) receiving a destination address for a data packet in a source port;
   b) determining a status of each of the plurality of ports, the status of a port corresponding to whether or not a port is designated as a destination port according to the destination address of the data packet;
   c) forming a bit map correlating a plurality of discrete logic levels to the status of the respective plurality of ports;
   d) placing the bit map on the communication bus; and
   e) determining if the source port is a destination port.

26. The method according to claim 25 further comprising the step of notifying the source port of whether or not it is a destination port for the packet while the packet is still being received by the multi-port bridge.

27. The method according to claim 26 further comprising the step of preventing the data packet from being transmitted into the segment corresponding to the source port if the source port is a destination for the packet.

28. The method according to claim 26 further comprising the step of notifying the source port for the packet whether any port other than the source port is a destination for the packet.

29. The method according to claim 28 further comprising the step of terminating any further action relative to the data packet if the source port is an only destination for the packet.

30. The method according to claim 28 further comprising the step of receiving the entire packet if a port other than the source port is designated as a destination port.

31. The method according to claim 30 further comprising the steps:

a) receiving a first portion of the data packet into a receive buffer;

b) transferring the first portion of the data packet into memory device other than the receive buffer; and c) receiving a second portion of the data packet into the receive buffer, wherein the step of receiving the second portion takes place subsequent to the step of transferring the first portion.

32. The method according to claim 25 wherein the step of determining comprises steps of:

a) transferring the destination address to a control circuit; and b) comparing the destination address to entries in a table.

* * * * *

UNITED STATES PATENT AND TRADEMARK OFFICE
CERTIFICATE OF CORRECTION

PATENT NO.    : 6,301,256 B1
DATED         : October 9, 2001
INVENTOR(S)   : Suresh L. Vasa It is certified that error appears in the above-identified patent and that said Letters Patent is hereby corrected as shown below:

Title page,
Item [56], References Cited, U.S. PATENT DOCUMENTS, change "5,808,816" to -- 5,805,816 --.
OTHER PUBLICATIONS, National Semiconductor, databook, change "1-127 to 1-529" to -- 1-527 to 1-529 --.
OTHER PUBLICATIONS, Printout of internet website, change "http://www.ti.com/sc/docs/network/gtswitch/product/htm#3150al" to -- http://www.ti.com/sc/docs/network/tswitch/product/htm#3150al --.

Column 4,
Lines 3-5, delete "busy, it retrieves the packet from the packet buffers for transmission to its corresponding network segment."
Line 46, change "Ser. No. "09/025/356" to -- 09/025,356 --.

Column 9,
Line 39, change reference numeral "$b_3$" to -- $b_{31}$ --.

Signed and Sealed this

Sixth Day of August, 2002

Attest:

JAMES E. ROGAN
Attesting Officer
Director of the United States Patent and Trademark Office